United States Patent
Kim et al.

(10) Patent No.: US 7,393,106 B2
(45) Date of Patent: Jul. 1, 2008

(54) COLOR FILTER UNIT AND PROJECTION SYSTEM EMPLOYING THE SAME

(75) Inventors: Sung-ha Kim, Seoul (KR); Dong-ha Kim, Suwon-si (KR); Ju-seong Hwang, Cheonan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 315 days.

(21) Appl. No.: 10/928,112

(22) Filed: Aug. 30, 2004

(65) Prior Publication Data

US 2005/0062942 A1 Mar. 24, 2005

Related U.S. Application Data

(60) Provisional application No. 60/505,171, filed on Sep. 24, 2003.

(30) Foreign Application Priority Data

Dec. 26, 2003 (KR) .................. 10-2003-0097798

(51) Int. Cl.
*G03B 21/14* (2006.01)
(52) U.S. Cl. .................. 353/20; 353/31; 353/84
(58) Field of Classification Search .................. 353/20, 353/31, 84
See application file for complete search history.

(56) References Cited

U.S. PATENT DOCUMENTS

| | | | | |
|---|---|---|---|---|
| 4,337,994 A * | 7/1982 | Brasier | .................. | 359/18 |
| 5,111,315 A * | 5/1992 | Ledebuhr | .................. | 349/5 |
| 5,921,650 A | 7/1999 | Doany et al. | | |
| 5,975,703 A | 11/1999 | Holman et al. | | |
| 6,280,034 B1 * | 8/2001 | Brennesholtz | .................. | 353/20 |
| 6,454,413 B1 | 9/2002 | Vaan De | | |
| 6,568,815 B2 * | 5/2003 | Yano | .................. | 353/84 |
| 6,789,902 B2 * | 9/2004 | Hayashi et al. | .................. | 353/20 |
| 7,068,404 B2 * | 6/2006 | Ouchi et al. | .................. | 359/15 |
| 7,083,282 B1 * | 8/2006 | Sharp et al. | .................. | 353/20 |
| 7,210,787 B2 * | 5/2007 | Kim et al. | .................. | 353/33 |
| 2002/0051100 A1 | 5/2002 | Kwon et al. | | |
| 2002/0089647 A1 * | 7/2002 | Leu | .................. | 353/20 |
| 2003/0030913 A1 | 2/2003 | Park et al. | | |
| 2003/0117529 A1 | 6/2003 | De Haan | | |
| 2003/0227680 A1 | 12/2003 | Chen et al. | | |

OTHER PUBLICATIONS

International Search Report PCT/KR2004/002391 issued on Dec. 29, 2004.

* cited by examiner

*Primary Examiner*—Christopher Mahoney
(74) *Attorney, Agent, or Firm*—Stanzione & Kim, LLP

(57) ABSTRACT

A color filter unit and a projection system employing the same. The color filter unit includes a first color selection polarization conversion element, which converts a polarization direction of a beam in a specific color band of an incident light, and a color filter, which separates light passed through the first color selection polarization conversion element according to color, so that color mixture in spectral boundaries between color beams is prevented. Because the color mixture occurring when beams into which light emitted from a white light source is separated are combined is prevented, the quality of an image is improved.

23 Claims, 11 Drawing Sheets

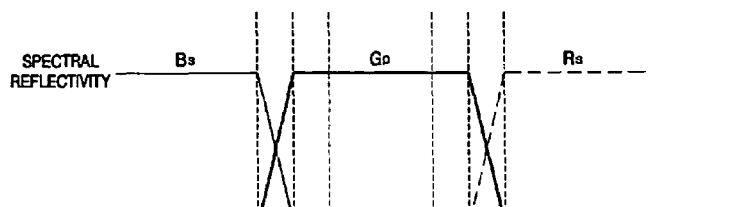
FIG. 5A
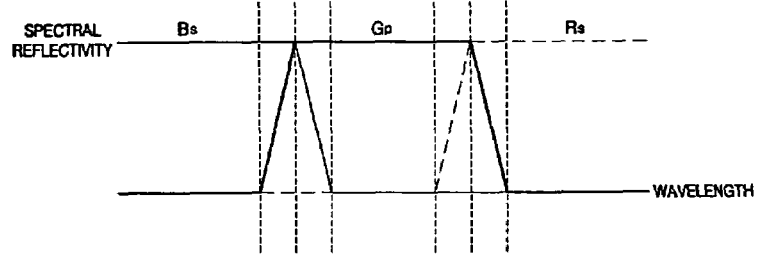
FIG. 5B
FIG. 6
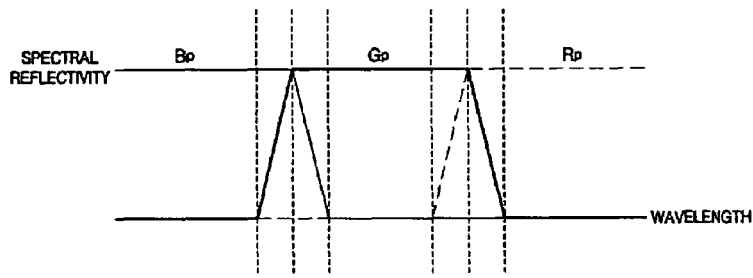

COLOR FILTER UNIT AND PROJECTION SYSTEM EMPLOYING THE SAME

CROSS-REFERENCE TO RELATED APPLICATIONS

This application claims the benefit of Korean Patent Application No. 2003-97798, filed on Dec. 26, 2003, in the Korean Intellectual Property Office, and the benefit of U.S. Provisional Patent No. 60/505,171, filed on Sep. 24, 2003, in the U.S. Patent and Trademark Office, the disclosures of which are incorporated herein in their entirety by reference.

BACKGROUND OF THE INVENTION

1. Field of the Invention

The present general inventive concept relates to a color filter unit and a projection system employing the same, and more particularly, to a color filter unit capable of preventing a degradation of the quality of an image due to color mixture occurring during combination after separation of light emitted from a white light source, and a projection system employing the color filter unit.

2. Description of the Related Art

Projection systems are classified into 3-panel projection systems or single-panel projection systems according to the number of light valves that are used. A light valve controls the on/off operation of light emitted from a light source (e.g., a high-output lamp) on a pixel-by-pixel basis and forms a picture. Single-panel projection systems can have a smaller optical system than three-panel projection systems but provide only ⅓ of the light efficiency of three-panel projection systems, because red (R), green (G), and blue (B) colors, into which white light is separated, are sequentially used. Hence, attempts to increase the optical efficiency of single-panel projection systems have been made.

Generally, in a single-panel projection system, light radiated from a white light source is separated into R, G, and B colors using a color filter, and the three colors are sequentially sent to a light valve. The light valve appropriately operates according to the sequence of colors received and creates images. As described above, a single-panel optical system sequentially uses colors, so the light efficiency is reduced to ⅓ of the light efficiency of a three-panel optical system. A scrolling method has been proposed to solve this problem. In a color scrolling method, white light is separated into R, G, and B colors, and the three colors are simultaneously sent to different locations on a light valve. Since an image cannot be produced until all of the R, G, and B colors for each pixel reach the light valve, color bars are moved at a constant speed using a specific method, thereby achieving scrolling.

In a conventional single-panel scrolling projection system, as shown in FIG. 1A, white light emitted from a light source 100 passes through first and second lens arrays 102 and 104 and a polarization conversion system 105 and is separated into R, G and B beams by first through fourth dichroic filters 109, 112, 122, and 139. To be more specific, the red beam R and the green beam G, for example, are transmitted by the first dichroic filter 109 and advance along a first light path $L_1$, while the blue beam B is reflected by the first dichroic filter 109 and travels along a second light path $L_2$. The red beam R and the green beam G on the first light path $L_1$ are separated by the second dichroic filter 112. The second dichroic filter 112 transmits the red beam R along the first light path $L_1$ and reflects the green beam G along a third light path $L_3$.

As described above, the light emitted from the light source 100 is separated into the red beam R, the green beam G, and the blue beam B, which are scrolled while passing through corresponding first through third prisms 114, 135, and 142. The first through third prisms 114, 135 and 142 are disposed on the first through third light paths $L_1$, $L_2$, and $L_3$, respectively, and rotate at a uniform speed such that R, G, and B colors are scrolled. A mirror 133 is arranged in the first light path $L_1$. The blue beam B and the green beam G that travel along the second and third light paths $L_2$ and $L_3$, respectively, are transmitted and reflected by the third dichroic filter 139, respectively, and then combined. Finally, the R, G, and B beams are combined by the fourth dichroic filter 122. The combined beam is transmitted by a polarized beam splitter 127 and forms a picture using a light valve 130.

The scrolling of the R, G, and B color bars due to the rotation of the first through third prisms 114, 135, and 142 is shown in FIG. 1B. Scrolling represents the movement of color bars formed on the surface of the light valve 130 when prisms corresponding to the R, G, and B colors are synchronously rotated. A frame is formed when the R, G, and B color bars on the light valve 130 circulate one cycle.

The light valve 130 processes picture information depending on an on-off signal for each pixel and forms a picture. The formed picture is magnified by a projecting lens (not shown) and is projected onto a screen.

To produce a color picture, a projection system having such a structure must perform a process of separating light emitted from the light source 100 into a plurality of color beams and recombining the separated beams.

During such color separation and color combination, a reflectance spectrum of each color beam obtained by a color filter moves toward a short wavelength with a variation of an angle at which the color beam is incident upon the color filter. Hence, color mixture occurs, consequently deteriorating the quality of an image.

The light emitted from the light source 100 is converted into light with an S polarization by the polarization conversion system 105. The light with the S polarization is separated into R, G, and B beams by the first, second, third, and fourth dichroic filters 109, 112, 122, and 139. Variations of spectral reflectivities of the S-polarization R, G, and B beams according to a wavelength are illustrated in FIGS. 2A, 2B, and 2C. FIG. 2A illustrates the spectral reflectivities of rays of the R beam that have different angles, FIG. 2B illustrates the spectral reflectivities of rays of the G beam that have different angles, and FIG. 2C illustrates the spectral reflectivities of rays of the B beam that have different angles. It can be seen from FIGS. 2A through 2C that a half power frequency moves toward a short wavelength with a variation of an incidence angle of a beam.

FIGS. 2A through 2C refer to a case where a beam in the air is incident upon a dichroic filter without passing through any medium. However, FIG. 2D illustrates variations of spectral reflectivities of rays of a red beam that have different angles, when the red beam is incident upon a color filter via a medium. The degree to which a half power frequency moves toward a short wavelength with a change of an incidence angle of an incident beam is greater when the beam was incident upon the color filter via the medium than when the beam was incident upon the color filter via the air.

While a spectral band of each color beam is moving toward the short wavelength with a change in the incidence angle, undesired beams are mixed with desired beams, consequently deteriorating the quality of an image.

SUMMARY OF THE INVENTION

The present general inventive concept provides a color filter unit capable of preventing a degradation of the quality of an image due to color mixture that occurs in spectral boundaries between color filters when beams separated by the color filters are combined to form a color image on a light valve, and a projection system employing the color filter unit.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing a color filter unit including: a first color selection polarization conversion element converting a polarization direction of a beam in a specific color band of an incident light; and a color filter separating light passed through the first color selection polarization conversion element according to color. Color mixture in spectral boundaries between color beams is prevented.

The color filter unit may further include a polarization conversion system, which converts the incident light into light having a single polarization, and a second color selection polarization conversion element, which is installed behind the color filter and converts polarization directions of beams in color bands other than the specific color band so as to unify the polarization directions of the color beams separated by the color filter.

The color filter may have reflection wavelength areas corresponding to different polarization direction for different colors.

The color filter includes a first dichroic filter reflecting a blue beam of the incident light and transmitting the remaining beams, a second dichroic filter reflecting a red beam and transmitting the remaining beams, and a third dichroic filter reflecting a green beam and transmitting the remaining beams.

The foregoing and/or other aspects and advantages of the present general inventive concept are also achieved by providing a projection system in which a color filter unit separates light emitted from a light source according to color, a polarization conversion system converts the light into light having a single polarization, and a light valve forms a color image using beams into which the light emitted from the light source is separated. The color filter unit includes: a first color selection polarization conversion element converting a polarization direction of a beam in a specific color band of an incident light; and a color filter separating light passed through the first color selection polarization conversion element according to color. Color mixture in spectral boundaries between color beams is prevented.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 5A illustrates a spectral distribution of beams passed through a first color selection polarization conversion element included in the color filter unit of FIG. 3;

FIG. 5B illustrates a spectral distribution of dichroic filters included in the color filter unit of FIG. 3;

FIG. 6 illustrates a spectral distribution of a beam transmitted by a second color selection polarization conversion element included in the color filter unit of FIG. 3;

DETAILED DESCRIPTION OF THE PREFERRED EMBODIMENTS

Figure 1A:
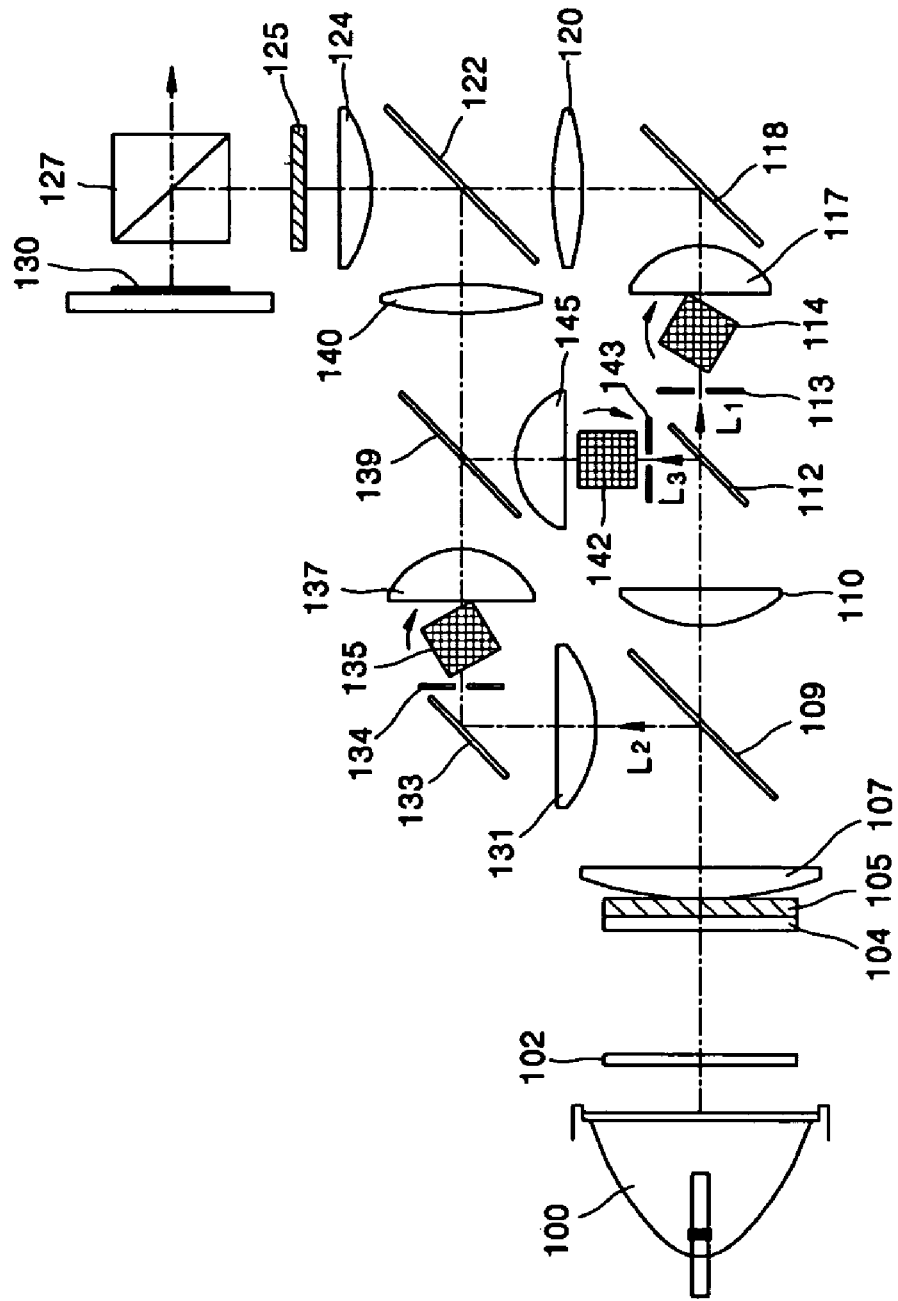
FIG. 1A shows a conventional projection system.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 3:
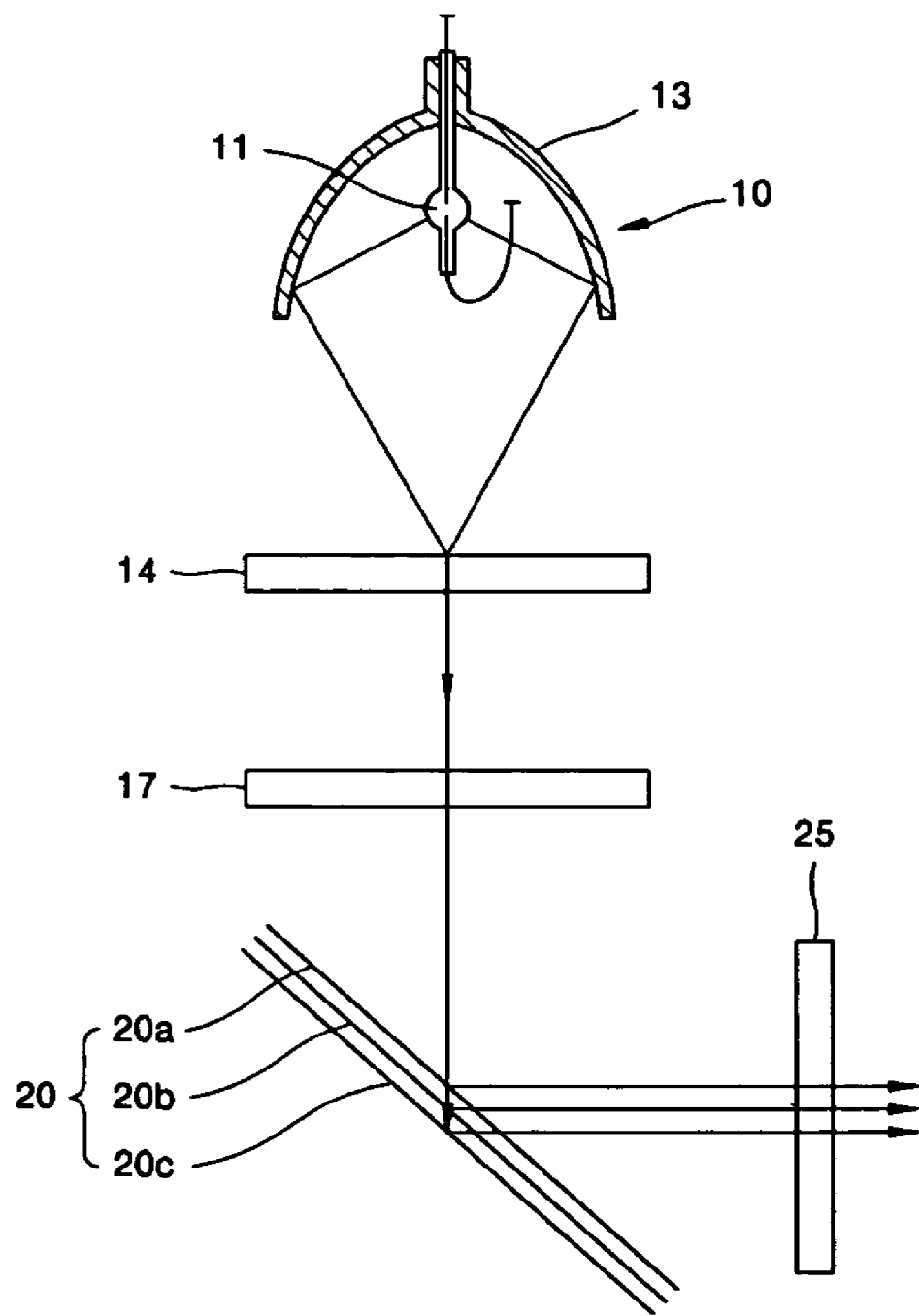
FIG. 3 is a schematic diagram of a color filter unit according to an exemplary embodiment of the present general inventive concept.

Referring to FIG. 3, a color filter unit according to an exemplary embodiment of the present invention includes first and second color selection polarization conversion elements 17 and 25 and a color filter 20. The first color selection polarization conversion element 17 changes a polarization direction of light emitted from a light source 10 according to a color band. The second color selection polarization conversion element 25 converts color beams produced by the color filter 20 into color beams each having a single polarization.

The light source 10 emits white light and comprises a lamp 11, to generate light, and a reflection mirror 13 to reflect light emitted from the lamp 11 and to guide the path of the reflected light. The reflection mirror 13 may be an elliptical mirror whose first focal point is the position of the lamp 11 and whose second focal point is a point where light is focused. Alternatively, the reflection mirror 13 may be a parabolic mirror which uses the lamp 11 as a focal point and which collimates light beams emitted from the lamp 11. The reflection mirror 13 shown in FIG. 3 is an elliptical mirror.

The color filter unit further includes a polarization conversion system 14 to convert the unpolarized white light emitted from the light source 10 into light with a single polarization.

The first color selection polarization conversion element 17 can selectively convert a polarization direction of light in a predetermined wavelength range.

The color filter 20 separates the light emitted from the light source 10 into at least two color beams by including at least two dichroic filters disposed in parallel with respect to each other and aslant with respect to an incident light axis. Alternatively, the at least two dichroic filters may be disposed at different angles with respect to each other and aslant with respect to the incident light axis. Alternatively, the color filter 20 may include at least two dichroic filters disposed in different light paths as in the prior art.

Preferably, the color filter 20 has reflection wavelength areas corresponding to different polarization directions for different colors.

As illustrated in FIG. 3, the color filter 20 includes first, second, third dichroic filters 20a, 20b, and 20c disposed in parallel with each other. The first dichroic filter 20a reflects a first color beam of an incident light and, at the same time, transmits the remaining beams. The second dichroic filter 20b reflects a second color beam and, at the same time, transmits the remaining beams. The third dichroic filter 20c reflects a third color beam and, at the same time, transmits the remaining beams.

A dichroic filter that reflects a color beam whose polarization direction has been converted by the first color selection polarization conversion element 17 can be disposed at a tail end of a queue of the first, second, and third dichroic filter 20a, 20b, and 20c on a light path.

For example, if the polarization direction of the third color beam is converted by the first color selection polarization conversion element 17, the third dichroic filter 20c to reflect the third color beam can be disposed at the tail of the queue.

The second color selection polarization conversion element 25 is used to unify polarization directions of beams passed through the color filter 20.

Figure 4:
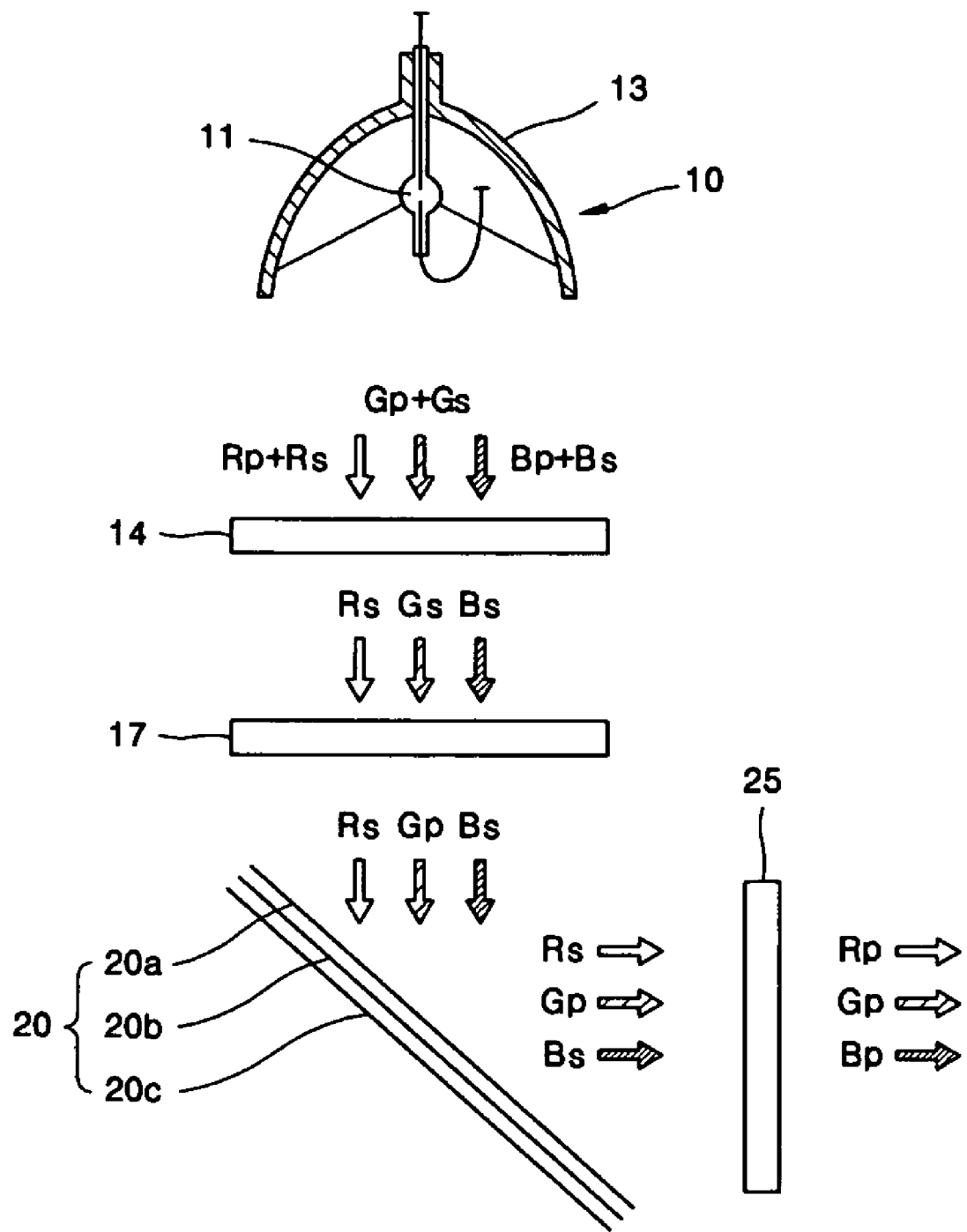
FIG. 4 illustrates a process in which light is converted by the color filter unit of FIG. 3.

An operation of the color filter unit will now be described in greater detail. Referring to FIG. 4, the polarization conversion system 14 converts unpolarized light emitted from the light source 10 into light with an S polarization, for example. For example, the unpolarized light includes P-polarized and S-polarized red beams Rp and Rs, P-polarized and S-polarized green beams Gp and Gs, and P-polarized and S-polarized blue beams Bp and Bs.

The polarization conversion system 14 converts the unpolarized light into light with a single polarization, for example, S-polarized beams Rs, Gs, and Bs. The first color selection polarization conversion element 17 converts the S-polarized green beam Gs into the P-polarized green beam Gp and maintains the S polarizations of the red and blue beams Rs and Bs. Hence, the S-polarized red beam Rs, the S-polarized blue beam Bs, and the P-polarized green beam Gp are incident upon the color filter 20. A spectral distribution of beams passed through the first color selection polarization conversion element 17 is shown in FIG. 5A.

The first dichroic filter 20a is designed to reflect a blue beam of an incident light and, at the same time, transmit the remaining beams. The second dichroic filter 20b is designed to reflect a red beam and, at the same time, transmit the remaining beams. The third dichroic filter 20c is designed to reflect a green beam. Hence, the color filter 20 separates the white light into the red beam, the green beam, and the blue beam.

FIG. 5B illustrates spectral distributions of the first, second, and third dichroic filters 20a, 20b, and 20c. The spectral distribution has spectral reflectivities corresponding to the polarizations of beams in different wavelength ranges by the first color selection polarization conversion element 17 illustrated in FIG. 5A. The spectral distribution is designed in such a shape that the spectral reflectivities of the blue and red beams are shifted toward a long wavelength area and a short wavelength area, respectively, compared to the first color selection polarization conversion element 17.

When the S-polarized blue beam Bs is reflected by the first dichroic filter 20a, the spectral reflectivity of the blue beam Bs shifts toward a short wavelength with an increase in the incidence angle of the blue beam Bs. Hence, the green or red beam Gp or Rs is not mixed with the blue beam Bs. Even when the spectral reflectivity of the blue beam Bs shifts toward a long wavelength with a decrease in the incidence angle of the blue beam Bs, the green beam Gp is not mixed with the blue beam because the green beam Gp has only a P polarization and thus is not reflected by the first dichroic filter 20a.

When the S-polarized red beam Rs is reflected by the second dichroic filter 20b, the spectral reflectivity of the red beam Rs shifts toward a short wavelength with an increase in the incidence angle of the red beam Rs. However, even when the spectral reflectivity of the second dichroic filter 20b, to reflect the red beam, moves toward the short wavelength area, the green beam Gp is not mixed with the red beam Rs because the green beam Gp passed through the first color selection polarization conversion element 17 has only a P polarization and thus is not reflected by the second dichroic filter 20b. Of course, when the spectral reflectivity of the second dichroic filter 20b moves toward the long wavelength area with a decrease in the incidence angle of the red beam Rs, the green beam Gp is not mixed with the red beam Rs.

When the P-polarized green beam Gp is reflected by the third dichroic filter 20c, the spectral reflectivity of the green beam Gp moves toward the short wavelength with the increase in the incidence angle of the green beam Gp. However, the blue beam Bs is not mixed with the green beam Gp because the blue beam Bs passed through the first color selection polarization conversion element 17 has only an S polarization. Even when the spectral reflectivity of the green beam Gp moves toward the long wavelength area with the decrease in the incidence angle of the green beam Gp, the red beam Rs is not mixed with the green beam Gp because the red beam Rs passed through the first color selection polarization conversion element 17 also has only an S polarization.

In the color filter unit according to an embodiment of the present general inventive concept, a characteristic that a spectral distribution of light passed through dichroic filters varies according to a polarization direction and a color of the light is used to prevent color beams separated by a color filter from being mixed with undesired color beams.

As shown in FIG. 6, the second color selection polarization conversion element 25 converts the S-polarized blue and red beams Bs and Rs into P-polarized blue and red beams, thereby producing the P-polarized red, green, and blue beams Rp, Gp, and Bp.

As described above, the color filter unit separates light emitted from a light source into a plurality of color beams while preventing a color mixture in spectral color boundaries.

Figure 7:
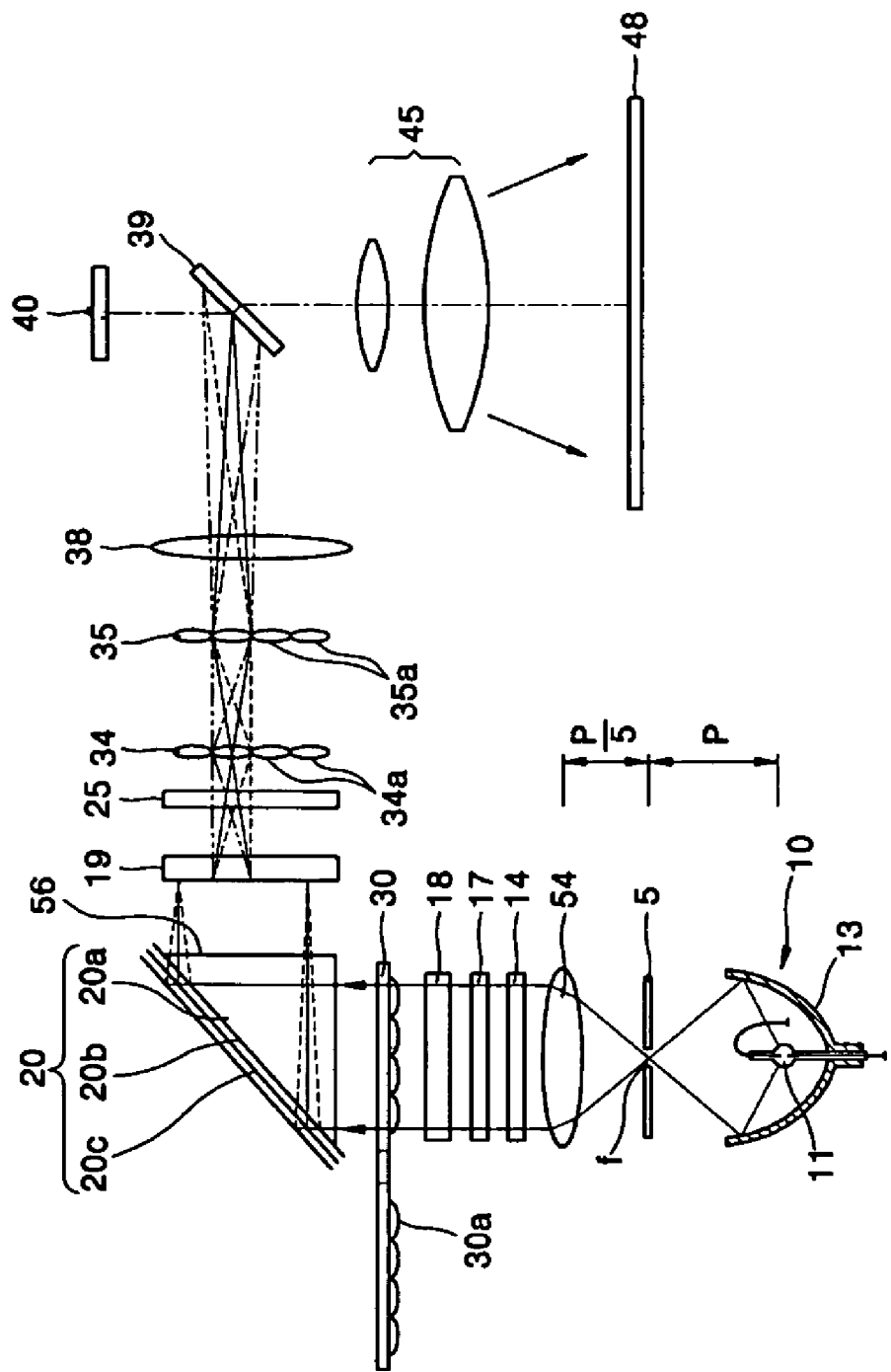
FIG. 7 is a schematic diagram of a projection system adopting a color filter unit, according to an exemplary embodiment of the present general inventive concept.

Referring to FIG. 7, a projection system according to an embodiment of the present invention includes a light source 10, a color filter unit, a scrolling unit 30, and a light valve 40. The color filter unit separates light emitted from the light source 10 into color beams. The scrolling unit 30 scrolls the color beams. The light valve 40 processes the beams passed through the color filter unit and the scrolling unit 30 according to an image signal and forms a picture.

The color filter unit is the same as the color filter unit of FIG. 3. The projection system is applicable to any system that forms a color image by modulating polarizations of color beams produced by the color filter unit of FIG. 3.

Particularly, the projection system of FIG. 7 forms a color image using color scrolling. In the projection system of FIG. 7, the color filter unit separates unpolarized white light emitted from the light source 10 into a plurality of color beams.

The color filter unit includes a first color selection polarization conversion element 17 to convert a polarization direction of a beam in a specific color band of an incident light, and a color filter 20, to separate the light passed through the first color selection polarization conversion element 17 into a plurality of color beams.

For example, the color filter 20 may be constructed with a plurality of dichroic filters that each reflect a beam of a specific color of an incident light and transmit beams of all other colors. In FIG. 7, the color filter 20 includes first, second, and third dichroic filters 20a, 20b, and 20c.

A collimating lens 54 to collimate incident light is installed on a light path between the light source 10 and the color filter 20. P denotes the distance between the light source 10 and a focal point (f) where light emitted from the light source 10 is focused. Preferably, but not necessarily, the collimating lens 54 is installed at a distance of P/5 from the focal point (f). By installing a projection system in this way, the structure of an optical system can be made more compact.

A spatial filter 5, having a slit, is installed between the light source 10 and the collimating lens 54. The spatial filter 5 controls the etendue of an optical system and is preferably, but not necessarily, installed at the focal point (f) of the reflection mirror 13.

A parallel light produced by the collimating lens 54 is converted into light with a single polarization by a polarization conversion system 14, and the light with the single polarization is incident upon the first color selection polarization conversion element 17. For example, the polarization conversion system 14 converts the light emitted from the light source 10 into light with an S polarization. The first color selection polarization conversion element 17 converts an S-polarized beam with a specific wavelength, for example, an S-polarized green beam, into a green beam with a P polarization and maintains S-polarized red and blue beams.

The P-polarized green beam and the S-polarized red and blue beams are incident upon the scrolling unit 30.

Figure 8A:
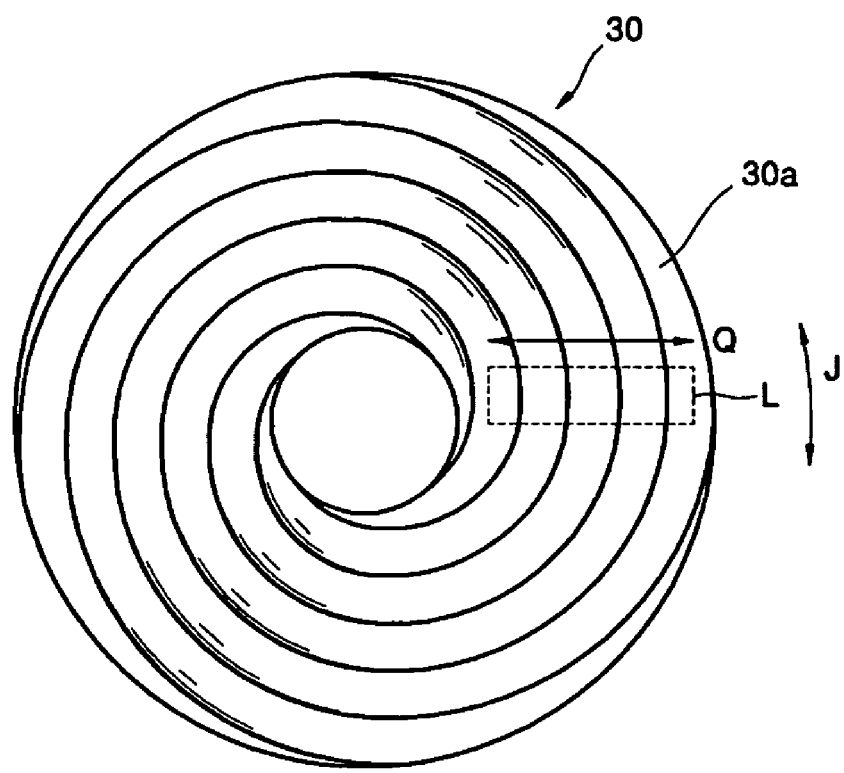
FIG. 8A is a front view of a scrolling unit used in the projection system of FIG. 7.

Referring to FIG. 8A, the scrolling unit 30 is rotatable and preferably includes at least one lens cell 30a which is arranged so that the rotation of the lens cell is converted into a rectilinear motion of an area of the lens cell through which light passes. For example, the lens cells 30a are disposed spirally on the scrolling unit 30. Each of the lens cells 30a divides incident light into a plurality of beams. The lens cells 30a may be cylindrical.

As illustrated in FIG. 8A, scrolling is performed by converting a rotation (which is in direction J) of the scrolling unit 30 into a rectilinear motion (which is in direction Q) of an area of a lens cell array through which light L passes. The scrolling unit 30 of FIG. 8A is a single spiral lens disk.

Figure 8B:
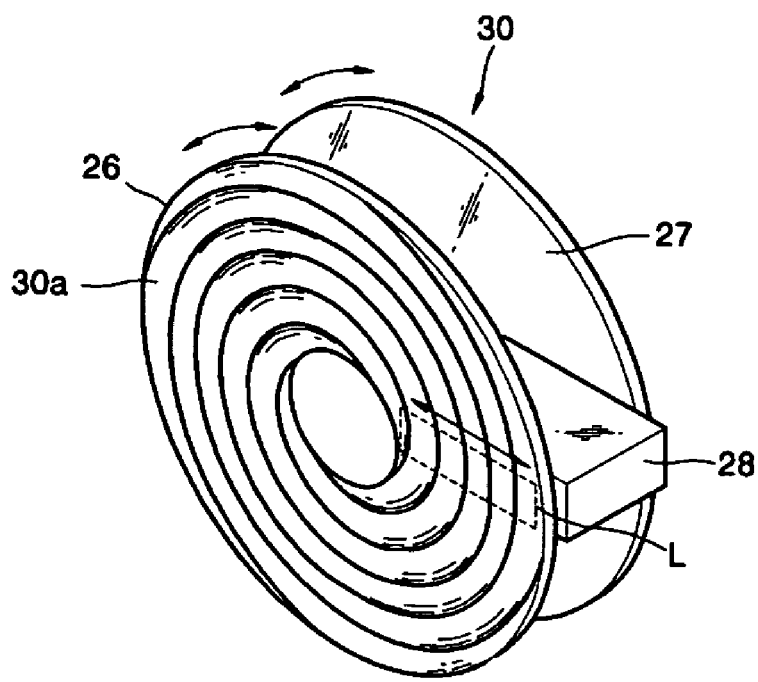
FIG. 8B is a perspective view of an alternate scrolling unit according to the exemplary embodiment of FIG. 7.

As illustrated in FIG. 8B, the scrolling unit 30 may be constructed with first and second spiral lens disks 26 and 27, disposed a predetermined distance from each other, and a glass rod or a light guide plate 28, interposed between the first and second spiral lens disks 26 and 27. The glass rod or the light guide plate 28 controls a divergence angle of light passed through the first spiral lens disk 26.

The light valve 40 processes light scrolled by the scrolling unit 30 according to an image signal and forms a color image.

A projection lens unit 45 magnifies the color image formed by the light valve 40 and projects the magnified color image onto a screen 48.

Rays included in a light beam incident upon the scrolling unit 30 are converged at different angles according to different locations on each of the cylindrical lens cells 30a upon which the rays are incident. The light beam rays are reflected by the first, second, or third dichroic filter 20a, 20b, or 20c such that the light beam is separated according to color. The projection system of FIG. 7 further includes a prism 56 disposed between the scrolling unit 30 and the color filter 20 such that an incident light is transferred to the color filter 20 without a change in the path of the light.

A first cylindrical lens 18 is disposed in front of the scrolling unit 30, and a second cylindrical lens 19, first and second fly-eye lens arrays 34 and 35, and a relay lens 38 are sequentially arranged on the light path between the color filter 20 and the light valve 40. The first and second fly-eye lens arrays 34 and 35 are formed by two-dimensionally arranging lens cells 34a and 35a, respectively.

The first cylindrical lens 18 reduces a width of light to be incident upon the scrolling unit 30, thereby reducing the light loss. The second cylindrical lens 19 widens the beam narrowed by the first cylindrical lens 18 to a beam with the original width. The second cylindrical lens 19 may alternatively be disposed between the first and second fly-eye lens arrays 34 and 35.

A polarization beam splitter 39, to reflect or transmit an incident beam according to a polarization of the incident beam, is installed between the relay lens 38 and the light valve 40. The light valve 40 of FIG. 7 is a reflective liquid crystal display. However, the light valve 40 may be a transmissive liquid crystal display.

In an operation of the projection system of FIG. 7 with the above-described configuration, first, white light emitted from the light source 10 is incident upon the polarization conversion system 14 via the spatial filter 5 and the collimating lens 54 and converted into light with a single polarization. Next, a polarization direction of only a specific color beam is changed by the first color selection polarization conversion element 17, and the resultant light is incident upon the scrolling unit 30. Before being incident upon the scrolling unit 30, the width of the resultant light is reduced by the first cylindrical lens 18.

The light incident upon the scrolling unit 30 is divided into a plurality of beams by each of the lens cells 30a, and the beams are incident upon the color filter 20. The beams are separated into a plurality of color beams, for example, first, second, and third color beams, by the first, second, and third dichroic filters 20a, 20b, and 20c. A color mixture of the first, second, and third color beams in color beam boundaries does not occur.

Polarization directions of the color beams are unified by the second color selection polarization conversion element 25. The light with a width reduced by the first cylindrical lens 18 is returned to its original width by being collimated by the second cylindrical lens 19. Hence, when the light with its original width lands on the light valve 40, the width of the light matches with a width of the light valve 40.

Figure 1B:
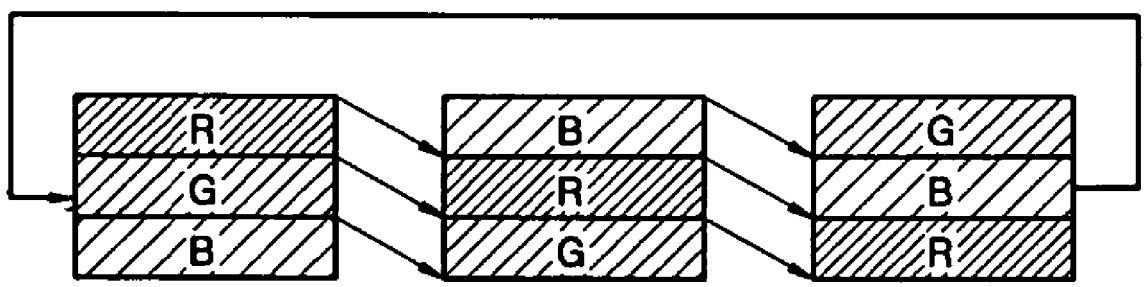
FIG. 1B shows R, G, and B color bars to explain the color scrolling operation of a projection system.
Figure 2A:
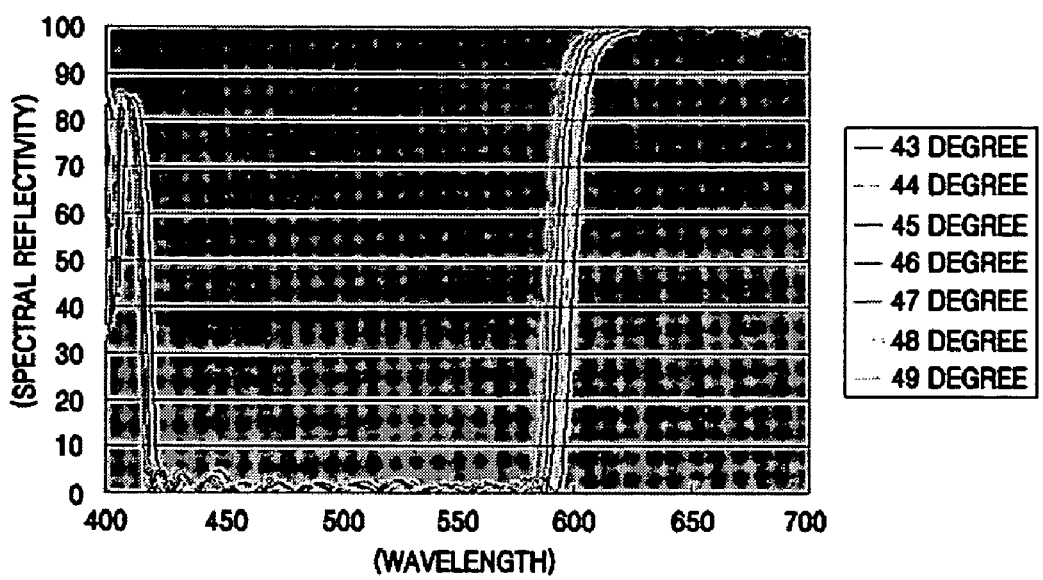
FIG. 2A is a graph showing spectral reflectivities of rays of a red beam with an S polarization that have different incidence angles, versus a wavelength of an incident beam in air.
Figure 2B:
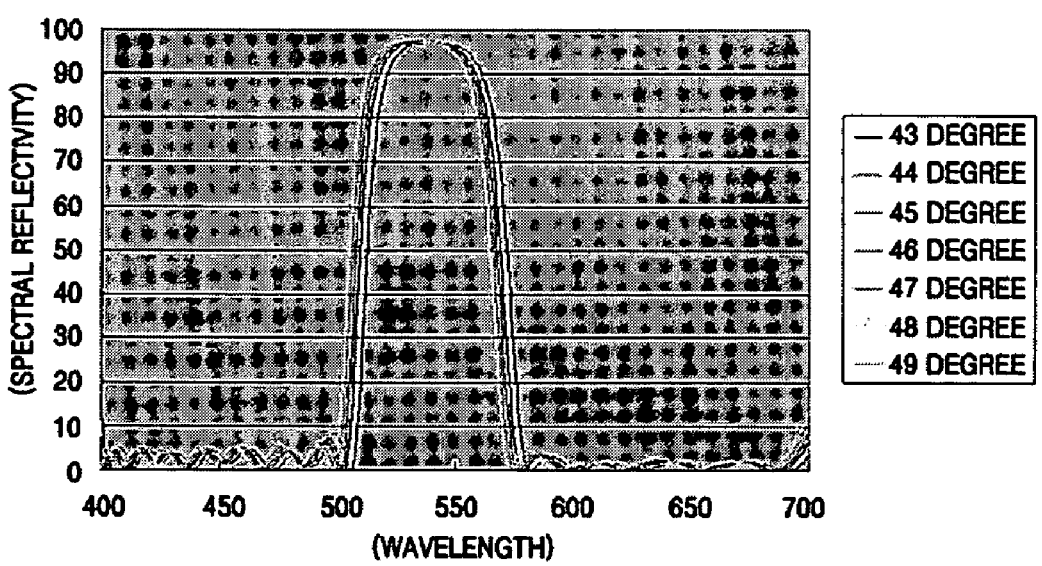
FIG. 2B is a graph showing spectral reflectivities of rays of a green beam with an S polarization that have different incidence angles, versus the wavelength of the incident beam in air.
Figure 2C:
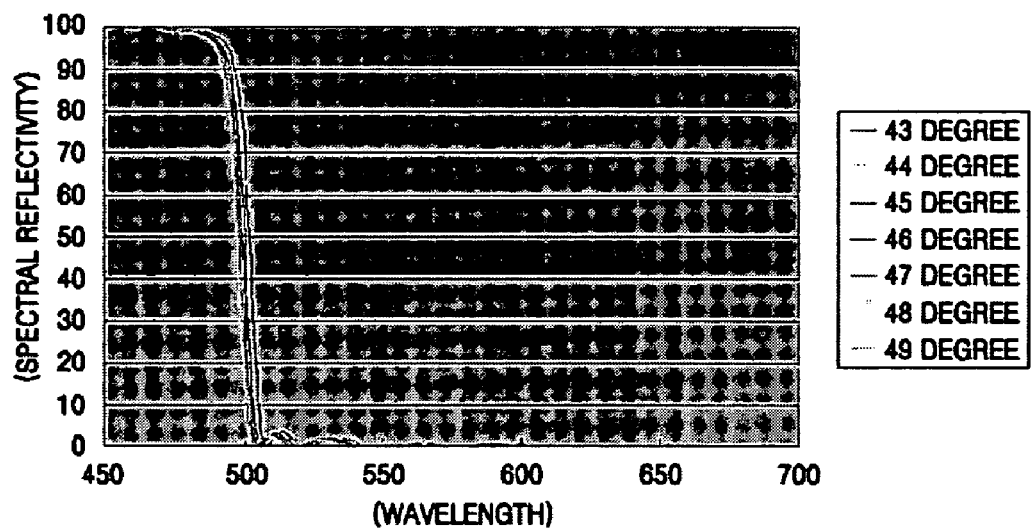
FIG. 2C is a graph showing spectral reflectivities of rays of a blue beam with an S polarization that have different incidence angles, versus the wavelength of the incident beam in air.
Figure 2D:
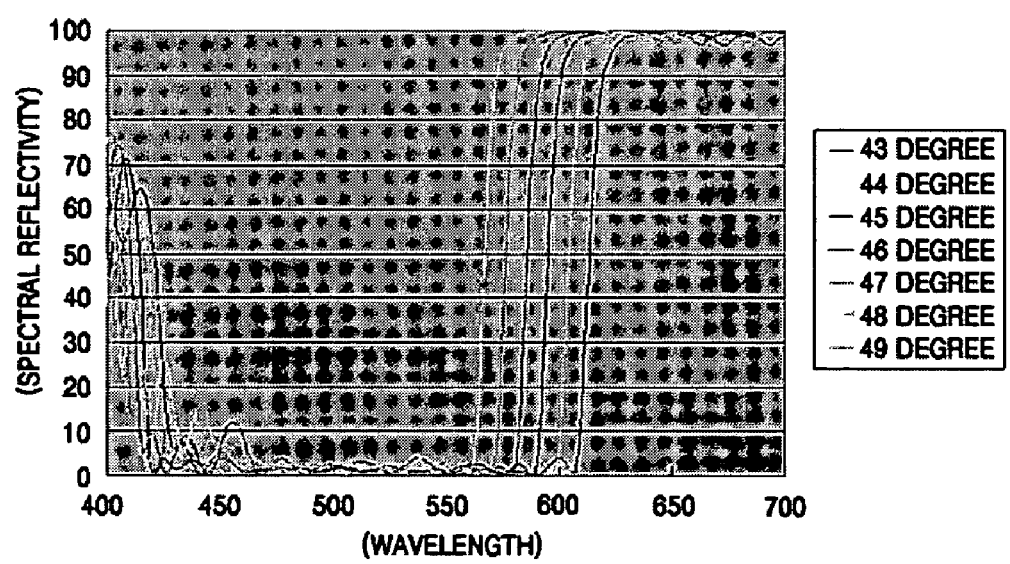
FIG. 2D is a graph showing spectral reflectivities of rays of a red beam with an S polarization that have different incidence angles, versus a wavelength of an incident beam within a medium.

Next, the first, second, and third color beams transmitted by the second cylindrical lens 19 are focused on the first fly-eye lens array 34 such as to form a color array on each of the lens cells 34a. After passing through the second fly-eye lens array 35 and the relay lens 38, the first, second, and third color beams are incident on corresponding color areas of the light valve 40. Thus, first, second, and third color bars are formed (see FIG. 1B).

The first, second, and third color bars are periodically scrolled with a rotation of the scrolling unit 30, thereby forming a color image. The first, second, and third color bars are the R, G, and B beams.

Figure 9A:
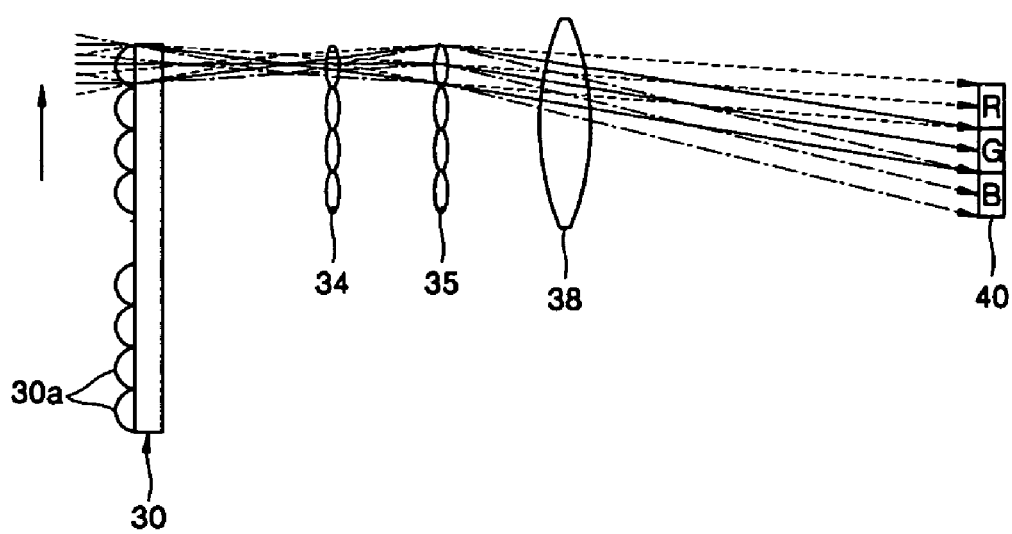
FIGS. 9A through 9C illustrate a principle in which a color picture is formed using color scrolling in the projection system of FIG. 7.
Figure 9B:
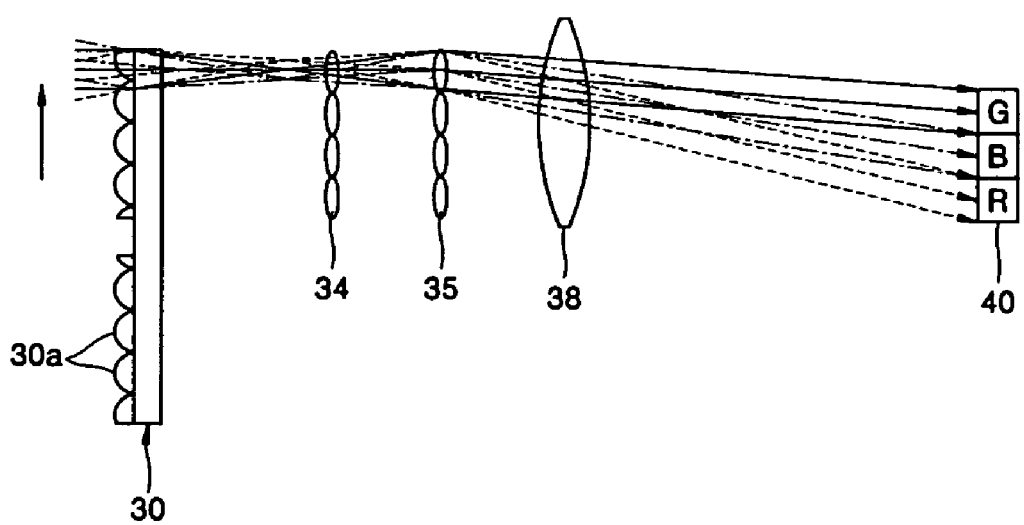
Figure 9C:
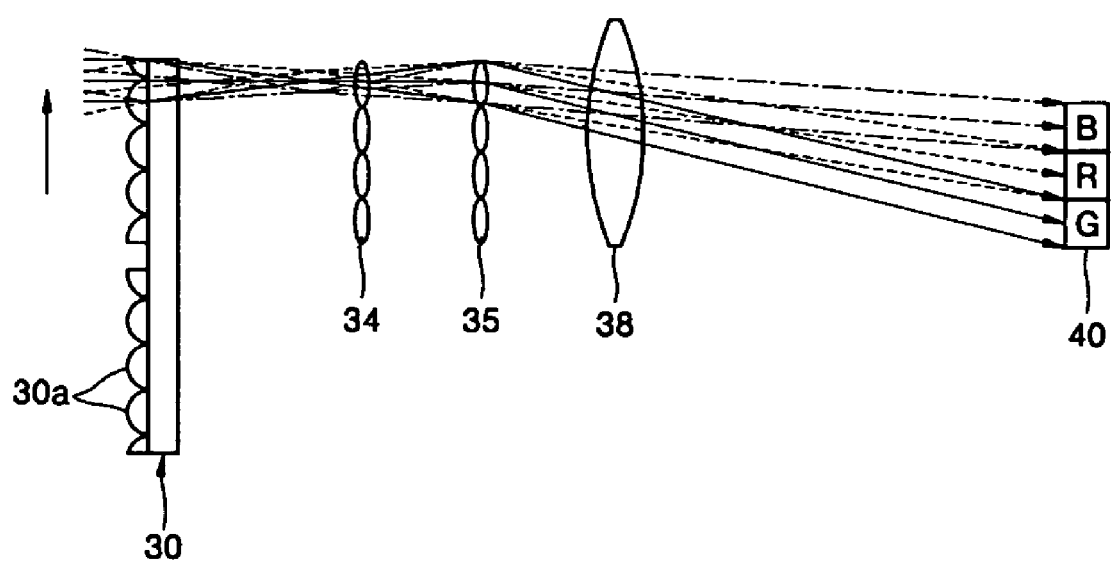

Referring to FIGS. 9A through 9C, with a rotation of the scrolling unit 30, the R, G, and B bars are scrolled first in an order of R, G and B, then in an order of G, B, and R, and finally in an order of B, R, and G. This scrolling is repeated periodically. In FIGS. 9A through 9C, the scrolling unit 30 is a single spiral lens disk. For convenience of explanation, only the first and second fly-eye lens arrays 34 and 35 and the relay lens 38 are illustrated between the scrolling unit 30 and the light valve 40.

As illustrated in FIG. 9A, the R, G, and B beams pass through the scrolling unit 30, the first and second fly-eye lens arrays 34 and 35, and the relay lens 38, and color bars are formed on the light valve 40 in a predetermined order, for example, in an order of R, G, and B. Next, the scrolling unit 30 rotates and the lens surface of the scrolling unit 30 gradually moves upward while the color beams L pass through the scrolling unit 30. Accordingly, the focal points of the color beams passing through the scrolling unit 30 vary as the scrolling unit 30 moves, and color bars in an order of G, B, and R are formed, as illustrated in FIG. 9B. Then, the scrolling unit 30 rotates, the incident color beams are scrolled, and color bars in an order of B, R, and G are formed as illustrated in FIG. 9C. Such scrolling is repeated periodically.

Referring to FIG. 8A, as the scrolling unit 30 rotates in directions indicated by arrow J, the incident light L rectilinearly moves in directions indicated by arrow Q. In other words, the incident light L rectilinearly moves in directions closer to or away from a rotating axis of the scrolling unit 30. In FIG. 8A, as the scrolling unit 30 rotates in directions indicated by arrow J, the incident light L rectilinearly moves in directions towards and away from the rotating axis of the scrolling unit 30.

In the projection system of FIG. 7, a mixture of color beams separated by the color filter unit in spectral boundaries of the color beams is prevented, so boundaries between color bars formed on the light valve 40 are distinct. Thus, the color purity and the quality of an image are improved.

Although the projection system which forms a color image using color scrolling has been described as examples herein, this does not limit the present general inventive concept. The above-described features of the present general inventive concept are applicable to systems which form color images using color separation and polarization modulation.

As described above, to prevent each of the color beams separated by color filters from being mixed with undesired color beams, the color filter unit uses a characteristic that a spectral distribution of light is changed according to a polarization direction and color of light after the light passes through the color filters.

To use this characteristic, the color filter unit includes a color selection polarization conversion element, to convert a polarization direction of a specific color beam, and a color filter, having a spectral distribution corresponding to light having a polarization direction into which the polarization direction of the specific color beam is converted by the color selection polarization conversion element. Accordingly, the color filter unit separates light into a plurality of color beams without a color mixture in boundaries between color beams.

The projection system according to an embodiment of the present invention adopts the above-described color filter unit to thereby simply and easily improve the quality and purity of a color image.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A color filter unit comprising:
   a first color selection polarization conversion element converting a polarization direction of a beam in a specific color band of an incident light; and
   a color filter separating light passed through the first color selection polarization conversion element according to color such that color mixture in spectral boundaries between color areas separated according to color is reduced.

2. The color filter unit of claim 1, further comprising a polarization conversion system converting the incident light into light having a single polarization.

3. The color filter unit of claim 2, wherein the polarization conversion system is positioned before the first color selection polarization conversion element along the path of the beams of light.

4. The color filter unit of claim 1, further comprising a second color selection polarization conversion element installed after the color filter with respect to the direction of the color beams, converting polarization directions of beams in color bands other than the specific color band so as to unify the polarization directions of the color beams separated by the color filter.

5. The color filter unit of claim 1, wherein the color filter has reflection wavelength areas corresponding to a different polarization direction for different colors.

6. The color filter unit of claim 1, wherein the color filter comprises a plurality of dichroic filters separating the incident light into a plurality of color beams.

7. The color filter unit of claim 6, wherein the color filter comprises a first dichroic filter reflecting a blue beam of the incident light and transmitting the remaining beams, a second dichroic filter reflecting a red beam and transmitting the remaining beams, and a third dichroic filter reflecting a green beam and transmitting the remaining beams.

8. The color filter unit of claim 7, wherein a polarization direction of the green beam is different from polarization directions of the blue and red beams.

9. The color filter unit of claim 8, wherein the third dichroic filter is disposed at a tail end of an arrangement of the first, second, and third dichroic filters on a traveling path of the incident light.

10. The color filter unit of claim 1, wherein the color filter comprises:
    a plurality of dichroic filters; and
    a dichroic filter, reflecting a color beam having a polarization direction different from polarization directions of other color beams due to a polarization conversion by the first color selection polarization conversion element, disposed at a tail end of an arrangement of the plurality of dichroic filters and on a traveling path of the incident light.

11. A projection system in which a color filter unit separates light emitted from a light source according to color, a polarization conversion system converts the light into light having a single polarization, and a light valve forms a color image using beams into which the light emitted from the light source is separated, the color filter unit comprising:

a first color selection polarization conversion element converting a polarization direction of a beam in a specific color band of an incident light; and a color filter separating light passed through the first color selection polarization conversion element according to color such that a color mixture in spectral boundaries between color areas separated according to color is reduced.

12. The projection system of claim 11, wherein the color filter unit further comprises a polarization conversion system converting the incident light into light having a single polarization.

13. The projection system of claim 11, wherein the color filter unit further comprises a second color selection polarization conversion element installed after the color filter, converting polarization directions of beams in color bands other than the specific color band so as to unify the polarization directions of the color beams separated by the color filter.

14. The projection system of claim 11, wherein the color filter has reflection wavelength areas corresponding to a different polarization direction for different colors.

15. The projection system of claim 11, wherein the color filter comprises a plurality of dichroic filters separating the incident light into a plurality of color beams.

16. The projection system of claim 15, wherein the color filter comprises a first dichroic filter reflecting a blue beam of the incident light and transmitting the remaining beams, a second dichroic filter reflecting a red beam and transmitting the remaining beams, and a third dichroic filter reflecting a green beam and transmitting the remaining beams.

17. The projection system of claim 16, wherein a polarization direction of the green beam is different from polarization directions of the blue and red beams.

18. The projection system of claim 11, wherein:
the color filter comprises a plurality of dichroic filters; and
a dichroic filter reflecting a color beam having a polarization direction different from polarization directions of other color beams due to a polarization conversion by the first color selection polarization conversion element is disposed at a tail end of an arrangement of the dichroic filters on a traveling path of the incident light.

19. A projection system comprising:
a light source having a reflecting mirror and emitting light;
a polarization conversion system to convert incident light from the emitted light into light having a single polarization;
a color filter unit comprising:
a first color selection polarization conversion element converting a polarization direction of a beam in a specific color band of an incident light, and
a color filter separating light passed through the first color selection polarization conversion element according to color such that a color mixture in spectral boundaries between color areas separated according to color is reduced; and
a light valve to form a color image using the light separated by the color filter.

20. The projection system of claim 19, further comprising a collimating lens located on the light path between the light source and the color filter.

21. The projection system of claim 20, wherein the collimating lens is positioned at a distance P/5 from a focal point in which the emitted light is focused, where P denotes the distance between the light source and the focal point where light emitted from the light source is focused by the reflecting mirror.

22. The projection system of claim 20, further comprising a spatial filter having a slit and positioned between the light source and the collimating lens.

23. The projection system of claim 22, wherein the spatial filter is positioned at the focal point of the emitted light.

* * * * *